US006974661B2

(12) United States Patent
Gore et al.

(10) Patent No.: US 6,974,661 B2
(45) Date of Patent: Dec. 13, 2005

(54) COMPOSITIONS, SYSTEMS, AND METHODS FOR IMAGING

(75) Inventors: Makarand P. Gore, Corvallis, OR (US); Marshall Field, Corvallis, OR (US); Vladek P Kasperchik, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 287 days.

(21) Appl. No.: 10/351,188

(22) Filed: Jan. 24, 2003

(65) Prior Publication Data

US 2004/0146812 A1 Jul. 29, 2004

(51) Int. Cl.[7] .................................................. G03C 1/73

(52) U.S. Cl. ....................... 430/343; 430/332; 430/338; 430/340; 430/341

(58) Field of Search ................................. 430/332, 338, 430/343, 341, 340, 270.15, 270.16, 270.18, 270.21, 945

(56) References Cited

U.S. PATENT DOCUMENTS

| | | | | |
|---|---|---|---|---|
| 3,658,543 A | | 4/1972 | Gerlach, Jr. et al. | |
| 4,142,151 A | | 2/1979 | Hansen | |
| 4,170,190 A | | 10/1979 | Warner | |
| 4,682,857 A | | 7/1987 | Tan | |
| 4,835,475 A | | 5/1989 | Hanakura et al. | |
| 4,835,476 A | | 5/1989 | Kurosawa | |
| 4,838,664 A | | 6/1989 | Graham | |
| 4,891,250 A | | 1/1990 | Weibe et al. | |
| 5,234,797 A | * | 8/1993 | Satake et al. | 430/338 |
| 5,294,374 A | | 3/1994 | Martinez et al. | |
| 5,354,724 A | | 10/1994 | Hoffmann et al. | |
| 5,434,119 A | * | 7/1995 | Satake et al. | 503/216 |
| 5,543,382 A | | 8/1996 | Watanabe et al. | |
| 5,673,028 A | | 9/1997 | Levy | |
| 6,015,896 A | | 1/2000 | Mistry et al. | |
| 6,017,981 A | | 1/2000 | Hugo | |
| 6,022,648 A | | 2/2000 | Jacobson et al. | |
| 6,025,486 A | | 2/2000 | Mistry et al. | |
| 6,137,669 A | | 10/2000 | Chiang et al. | |
| 6,251,571 B1 | | 6/2001 | Dessauer et al. | |
| 6,407,560 B1 | | 6/2002 | Walraven et al. | |
| 6,486,473 B2 | | 11/2002 | Salapow et al. | |
| 6,549,025 B1 | | 4/2003 | Tubera et al. | |
| 2002/0045548 A1 | | 4/2002 | Saito | |
| 2002/0089580 A1 | | 7/2002 | Suzuki et al. | |
| 2002/0183203 A1 | | 12/2002 | Hoefs et al. | |
| 2003/0003399 A1 | | 1/2003 | Muller et al. | |

FOREIGN PATENT DOCUMENTS

| | | | |
|---|---|---|---|
| EP | 0 304 936 | | 8/1988 |
| EP | 0 372 878 | | 12/1989 |
| EP | 0716135 B1 | | 6/1999 |
| EP | 1 375 182 | | 1/2004 |
| JP | 5-278329 A | * | 10/1993 |
| WO | WO 2004/067289 | | 8/2004 |
| WO | WO 2004/067653 | | 8/2004 |

OTHER PUBLICATIONS

H. Bouas–Laurent et al., "Organic Photochromism" (IUPAC Technical Report), Pure Appl. Chem., vol. 73, No. 4, pp. 639–665, 2001.

"Protected Activators For Use In Leuco Dye Compositions," U.S. Appl. No. 10/656,735, filed Sep. 5, 2003, Hewlett–Packard Company, pp. 1–28.

"Metal Salt Activators For Use In Leuco Dye Compositions," U.S. Appl. No. 10/656,539, filed Sep. 5, 2003, Hewlett–Packard Company, pp. 1–30.

* cited by examiner

*Primary Examiner*—John A. McPherson

(57) ABSTRACT

A composition, method, and system for recording an image. The system includes a multiphase imaging material in which energy is absorbed by an antenna material. The absorbed energy causes the reaction of an activator and a color-forming material.

47 Claims, 1 Drawing Sheet

COMPOSITIONS, SYSTEMS, AND METHODS FOR IMAGING

BACKGROUND

Materials that produce color change upon stimulation with energy such as light or heat may have possible applications in imaging. For example, such materials may be found in thermal printing papers and instant imaging films. Generally, the materials and compositions known so far may require a multifilm structure and further processing to produce an image (e.g., instant imaging films such as Polaroid). And in the case of facsimile and thermal head media, high energy input of greater than 1 J/cm$^2$ is needed to achieve good images. The compositions in multifilm media may require control of diffusion of color-forming chemistry and further processing, and are in separate phases and layers. Most thermal and facsimile paper coatings consist of coatings prepared by preparing fine dispersions of more than two components. The components mix and react upon application of energy, resulting in a colored material. To the necessary mixing, the particles need to contact across three or more phases or layers and merge into a new phase. Because of these multiple phases and layers, high energy is required to perform this process. For example, a relatively powerful carbon dioxide laser with an energy density of 3 J/cm$^2$ at times of much greater than 100 $\mu$s may be needed to produce a mark. In some instances, this high energy application may cause damage to the imaging substrate. In many situations, it may be desirable to produce a visible mark more efficiently using either a less intense, less powerful, and/or shorter energy application. Therefore, there is a need for fast marking coatings, possibly composed of fewer than three phases and in single layer. Single layer color-forming materials, initiated and addressable by radiation, particularly with energy density of less than 1 J/cm$^2$ delivered in less than 100 $\mu$s is hereto unknown.

SUMMARY

Disclosed herein are imaging materials and methods of making imaging materials. The materials disclosed herein may include an antenna, a color former and an activator, all dispersed in a matrix. The color former and the activator are present in the imaging material in two separate phases. The antenna readily absorbs energy which may be applied imagewise to the imaging materials. This absorbed energy heats the mixture which causes the color former and the activator to mix and react, causing the color former to change color and a mark to be produced.

BRIEF DESCRIPTION OF THE DRAWINGS

For a detailed description of embodiments of the invention, reference will now be made to the accompanying drawings in which.

NOTATION AND NONEMCLATURE

Certain terms are used throughout the following description and claims to refer to particular system components. As one skilled in the art will appreciate, companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." The term "leuco dye" is a color forming substance which is colorless or one color in a non-activated state and produces or changes color in an activated state. As used herein, the term "activator" is a substance which reacts with a leuco dye and causing the leuco dye to alter its chemical structure and change or acquire color. By way of example only, activators may be phenolic or other proton donating species which can effect this change. The term "antenna" means any radiation absorbing compound the antenna readily absorbs a desired specific wavelength of the marking radiation.

DETAILED DESCRIPTION

The following discussion is directed to various embodiments of the invention. The embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention include coatings that result in clear marks and excellent image quality when marked with a 780 nm laser operating at 45 mw. The materials used to produce color change upon stimulation by energy may include a color-former such as a fluoran leuco dye and an activator such as sulphonylphenol dispersed in a matrix such as radiation-cured acrylate oligomers and monomers and applied to a substrate. In particular embodiments, either the leuco dye or the activator may be substantially insoluble in the matrix at ambient conditions. An efficient radiation energy absorber that functions to absorb energy and deliver it to the reactants is also present in this coating. Energy may then be applied by way of, for example, a laser or infrared light. Upon application of the energy, either the activator, the color-former, or both may become heated and mix which causes the color-former to become activated and a mark to be produced.

Figure 2:
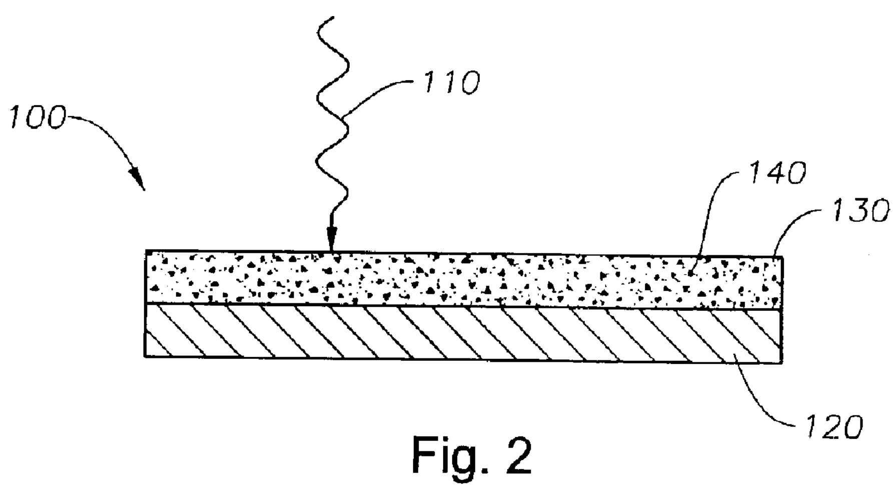
FIG. 2 shows an imaging medium according to an embodiment of the present invention.

Referring now to the embodiments illustrated in FIG. 2, there is shown imaging medium 100, energy 110, substrate 120, imaging composition 130, and suspended particles 140. Imaging medium 100 may comprise a substrate 120. Substrate 120 may be any substrate upon which it is desirable to make a mark, such as, by way of example only, paper (e.g., labels, tickets, receipts, or stationary), overhead transparencies, or the labeling surface of a medium such as a CD-R/RW/ROM or DVD-R/RW/ROM.

Imaging composition 130 may comprise a matrix, an activator, a radiation absorbing compound such as a dye, and a color forming dye. The activator and the color forming dye, when mixed, may change color. Either of the activator and the color forming dye may be soluble in the matrix. The other component (activator or color forming dye) may be substantially insoluble in the matrix and may be suspended in the matrix as uniformly distributed particles 140. The imaging composition 130 may be applied to the substrate via any acceptable method, such as, by way of example only, rolling, spraying, or screen printing.

Energy 110 may be directed imagewise to imaging medium 100. The form of energy may vary depending upon the equipment available, ambient conditions, and desired result. Examples of energy which may be used include IR radiation, UV radiation, x-rays, or visible light. The antenna may absorb the energy and heat the imaging composition 130. The heat may cause suspended particles 140 to reach a temperature sufficient to cause the interdiffusion of the color forming species initially present in the particles (e.g., glass transition temperatures ($T_g$) or melting temperatures ($T_m$) of particles 140 and matrix). The activator and dye may then react to form a color.

Examples 1 and 2 illustrate exemplary embodiments of the present invention. Several modifications may be made that are within the scope of the present invention. For example, antenna 60 may be any material which effectively absorbs the type of energy to be applied to the imaging medium to effect a mark. By way of example only, the following compounds IR780 (Aldrich 42,531-1) (1), IR783 (Aldrich 54,329-2) (2), Syntec 9/1(3), Syntec 9/3(4) or metal complexes (such as dithlolane metal complexes (5) and indoaniline metal complexes (6)) may be suitable antennae:

(1)

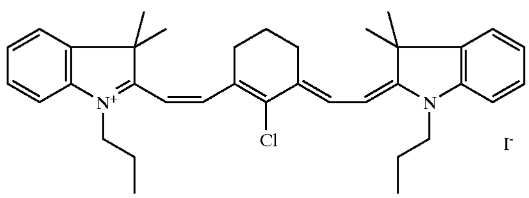

(2)

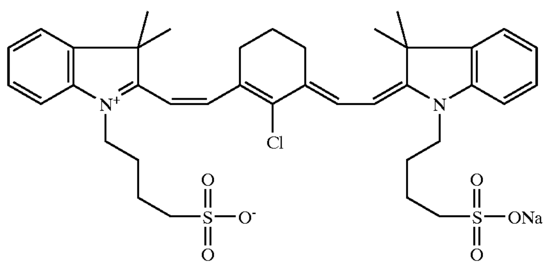

(3)

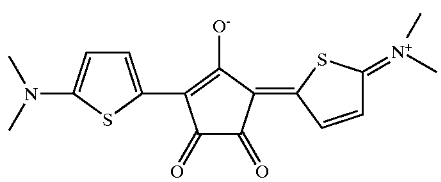

(4)

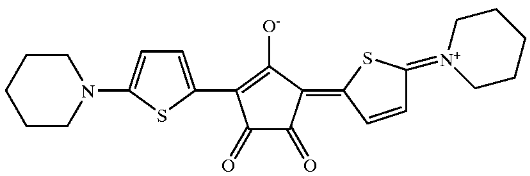

(5)

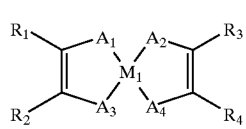

where $M_1$ is a transition metal, $R_1$, $R_2$, $R_3$, and $R_4$ are alkyl or aryl groups with or without halo substituents and $A_1$, $A_2$, $A_3$, and $A_4$ can be S, NH, or Se;

(6)

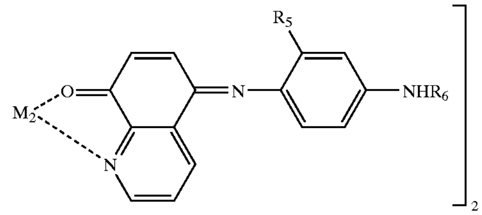

where $M_2$ is Ni or Cu and $R_5$ and $R_6$ are aryl or alkyl groups with or without halo substituents. Other examples of antennae may include quinone, phthalocyanine, naphthalocyanine, metal complexes, azo, croconium, squarilium dyes, and hexafunctional polyester oligomers. Additional examples of antennae can be found in "Infrared Absorbing Dyes", Matsuoka, Masaru, ed., Plenum Press (1990) (ISBN 0-306-43478-4) and "Near-Infrared Dyes for High Technology Applications", Daehne, S.; Reuch-Genger, U.; Wolfbeis, O., Ed., Kiuwer Academic Publishers (ISBN 0-7923-5101-0), both Incorporated herein by reference.

The activator (e.g., bisphenol-A) and color-forming dye 90 (e.g., BK-400) may act in tandem to produce a mark. The activator and dye may be any two substances which when reacted together produce a color change. When reacted, the activator may initiate a color change in the dye or develop the dye. One of the activator and the dye may be soluble in the matrix (e.g., lacquer 30) at ambient conditions. The other may be substantially insoluble in the lacquer at ambient conditions. By "substantially insoluble," it is meant that the solubility of the other in the lacquer at ambient conditions is so low, that no or very little color change may occur due to reaction of the dye and the activator at ambient conditions. Although, in the embodiments described above, the activator may be dissolved in the lacquer and the dye remains suspended as a solid in the matrix at ambient conditions, it is also acceptable that the color former may be dissolved in the matrix and the activator may remain as a suspended solid at ambient conditions. Activators may include, without limitation, proton donors and phenolic compounds such as bisphenol-A and bisphenol-S. Color formers may include, without limitation, leuco dyes such as fluoran leuco dyes and phthalide color formers as described in "The Chemistry and Applications of Leuco Dyes", Muthyala, Ramiah, ed., Plenum Press (1997) (ISBN 0-306-45459-9), incorporated herein by reference. Examples of acceptable fluoran leuco dyes comprise the structure shown in Formula (7)

(7)

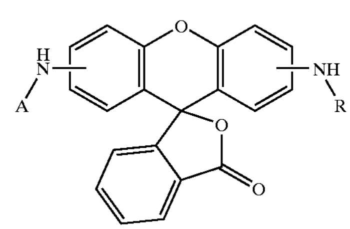

where A and R are aryl or alkyl groups.

Lacquer 30 may be any suitable matrix for dissolving and/or dispersing the activator, antenna, and color former. Acceptable lacquers may include, by way of example only, UV curable matrices such as acrylate derivatives, oligomers and monomers, with a photo package. A photo package may include a light absorbing species which initiates reactions for curing of a lacquer, such as, by way of example, benzophenone derivatives. Other examples of photoinitiators for free radical polymerization monomers and prepolymers include but are not limited to: thioxanethone derivatives, anthraquinone derivatives, acetophenones and benzoine ether types. It may be desirable to choose a matrix which is cured by a form of radiation other than the type of radiation which causes a color change. Matrices based on cationic polymerization resins may require photo-initiators based on aromatic diazonium salts, aromatic halonium salts, aromatic sulfonium salts and metallocene compounds. An example of an acceptable lacquer or matrix may include Nor-Cote CDG000 (a mixture of UV curable acrylate monomers and oligomers) which contains a photoinitiator (hydroxy ketone) and organic solvent acrylates (e.g., methyl methacrylate, hexyl methacrylate, beta-phenoxy ethyl acrylate, and hexamethylene acrylate). Other acceptable lacquers or matrices may include acrylated polyester oligomers such as CN293 and CN294 available from Sartomer Co.

EXAMPLES

Example 1

Figure 1:
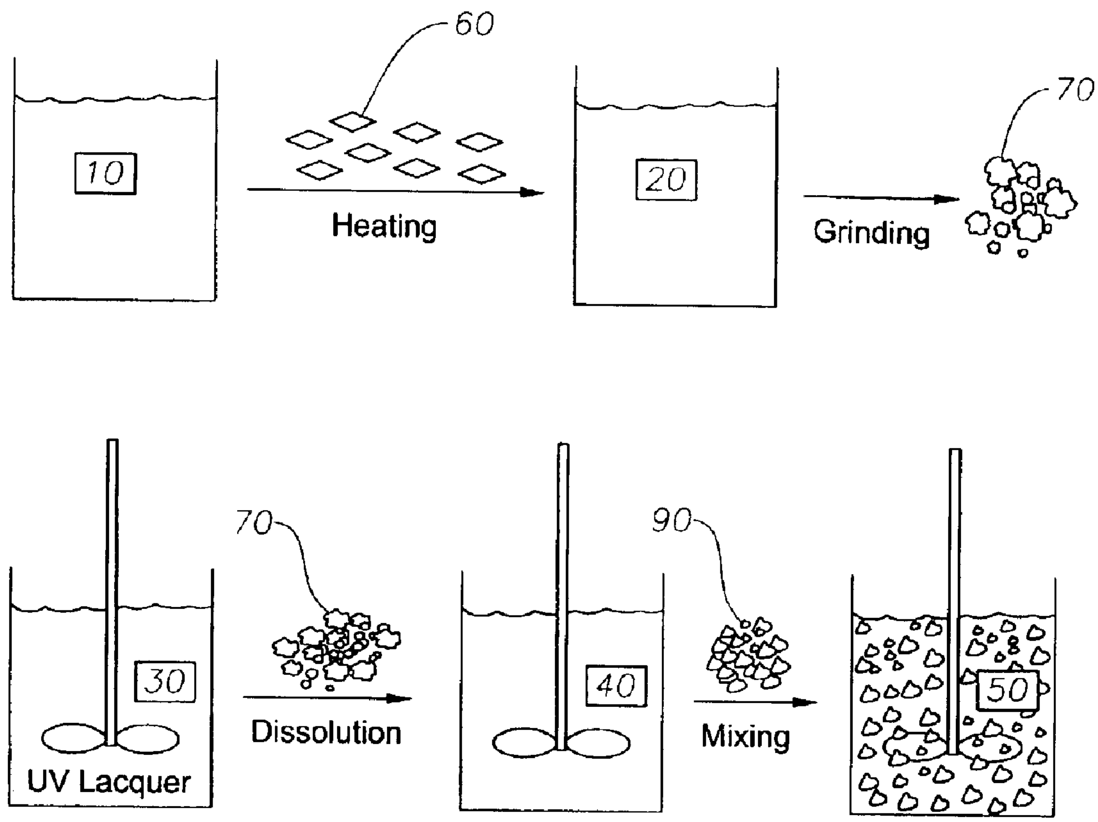
FIG. 1 shows a method of preparing an imaging material according to an embodiment of the present invention.

Referring to the embodiments of FIG. 1, there is shown a method for preparing an imaging solution in accordance with embodiments of the present invention, the method may comprise an activator melt 10, an activator/antenna solution 20, a UV curable lacquer solution 30, a lacquer/antenna/activator solution 40, and a two phase UV curable paste 50. In the embodiments illustrated in FIG. 1, 2 grams of dibenzyl oxalate was heated to melting (≈85° C.). Twenty grams of activator bisphenol-A and one gram of antenna IR780 were dissolved in the melted dibenzyl oxalate. The activator/antenna solution 20 was cooled and ground into a fine powder 70.

Five grams of the ground activator/antenna powder 70 was dissolved in 15.3 g Nor-Cote CDG000 UV-lacquer (a mixture of UV curable acrylate monomers and oligomers) 30 to form the lacquer/antenna/activator solution 40 into which 14.5 g BK-400 leuco dye (2'-anilino-3'-methyl-6'-(dibutylamino)fluoran—available from Nagase, the structure of which is set forth below as Formula 8)

(8)

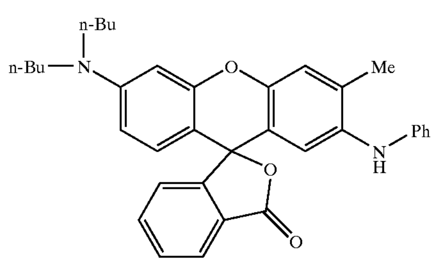

(average particle size <5 $\mu$m) 90 and 1.9 g pure bisphenol-A (average particle size <5 $\mu$m) was added. The mixture was rendered to a fine paste and screen printed onto a substrate at a thickness of approximately 7 $\mu$m to form an imaging medium (not shown). The coating on the medium was then UV cured by mercury lamp.

Direct marking was effected on the resulting coated substrate with a 45 mW laser. A mark of approximately 20 $\mu$m×45 $\mu$m was produced with energy applications of about 20 $\mu$sec to 100 $\mu$sec. Direct marking occurs when the desired image is marked on the imaging medium, without the use of a printing intermediary.

Example 2

In the embodiments of Example 2, 2 grams of dibenzyl oxalate was heated to melting (≈85° C.). Twenty grams of activator TG-SA (Phenol, 4,4'-sulfonylbis[2-(2-propenyl)-(9Cl)) (Formula (9))

(9)

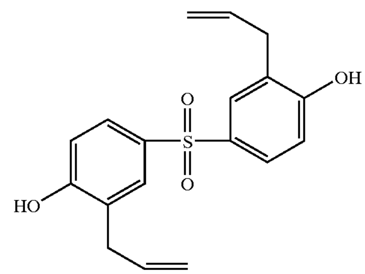

and 1.2 gram of antenna IR780 were dissolved in the melted dibenzyl oxalate. The activator/antenna solution 20 was cooled and ground into a fine powder 70.

1.8 grams of the ground activator/antenna powder 70 was dissolved in 15.3 g Nor-Cote CDG000 UV-lacquer 30 to form the lacquer/antenna/activator solution 40 into which 15 g S-205 leuco dye (2-anilino-3-methyl-6-(N-ethyl-N-isoamylamino)fluorane—available from "Nagase Co., Ltd") (Formula (10)).

(10)

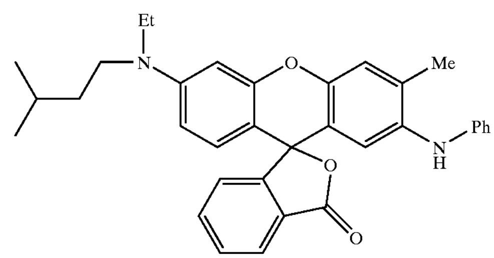

(average particle size <5 $\mu$m) 90 and 2.0 g pure bisphenol-A (average particle size also <5 $\mu$m) was added. The mixture was rendered to a fine paste and screen printed onto a substrate at a thickness of approximately 7 $\mu$m to form an imaging medium (not shown). The coating on the medium was then UV cured by mercury lamp. Direct marking was effected on the resulting coated substrate with a 45 mW laser. A mark of approximately 20 $\mu$m×45 $\mu$m was produced with energy applications of about 60 $\mu$sec to 100 $\mu$sec.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A direct imaging compound comprising:

a matrix;

an antenna dissolved in the matrix;

a color former; and an activator;

wherein one of the activator and the color former is soluble in the matrix or matrix precursor at ambient conditions;

wherein the soluble of the activator and the color former is dissolved in the matrix; and wherein the other of the activator and the color former is substantially uniformly distributed in the matrix.

2. The compound of claim 1 wherein the color former comprises at least one compound chosen from the group consisting of a leuco dye end a phthalide dye.

3. The compound of claim 2 wherein the leuco dye comprises the following structure:

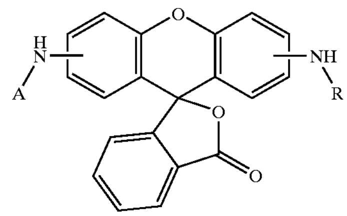

where A and R are aryl or alkyl groups.

4. The compound of claim 1 wherein the activator comprises a phenolic compound.

5. The compound of claim 1 wherein the antenna comprises at least one of the compounds chosen from the group consisting of quinone, phthalocyanine, naphthalocyanine, metal complexes, azo, croconium, squarilium dyes, hexafunctional polyester oligomers, and the compounds represented by the following formulae:

(A)

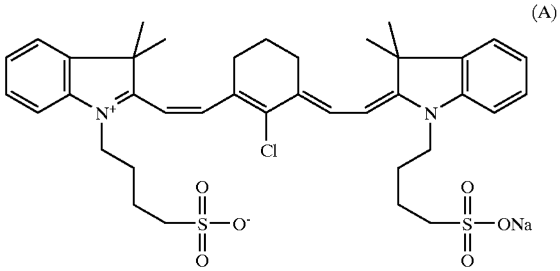

(B)

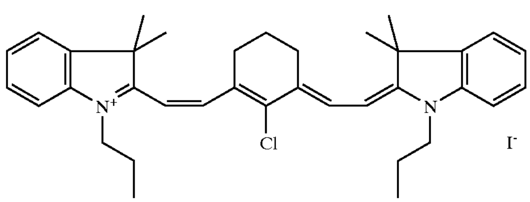

(C)

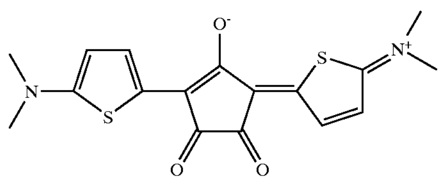

(D)

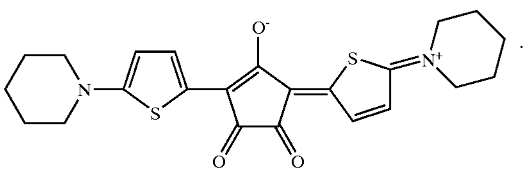

6. The compound of claim 1 wherein the antenna is tuned to readily absorb laser radiation.

7. The compound of claim 6 wherein the antenna is tuned to readily absorb infrared radiation.

8. The compound of claim 1 wherein the other of the activator and the color former comprises particles with an average diameter of no more than about 20 μm.

9. The compound of claim 1 wherein the direct imaging compound comprises 3 wt %–90 wt % solid particles.

10. The compound of claim 1 wherein the direct imaging compound comprises 5 wt %–80 wt % solid particles.

11. The compound of claim 1 wherein the direct imaging compound comprises 10 wt %–60 wt % solid particles.

12. The compound of claim 1 wherein the matrix comprises an ultraviolet curable compound.

13. A method for preparing a direct imaging material, the method comprising:

providing a binder, a dye, a color developer, and an antenna, wherein the dye changes color when reacted with the color developer, wherein one of the dye and the color developer is soluble in the binder at ambient conditions;

dissolving the antenna and the binder soluble compound in the binder; and substantially uniformly distributing the other of the dye and the color developer compound in the binder.

14. The method of claim 13 wherein the dye comprises a leuco dye.

15. The method of claim 14 wherein the leuco dye comprises the following structure:

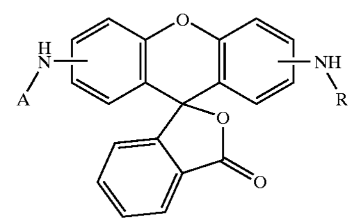

where A and R are aryl or alkyl groups.

16. The method of claim 13 wherein the color developer comprises a phenolic compound.

17. The method of claim 13 wherein the antenna comprises at least one of the compounds chosen from the group consisting of quinone, phthalocyanine, naphthalocyanine, metal complexes, azo, croconium, squarilium dyes, hexafunctional polyester oligomers, and the compounds represented by the following formulae:

(A)

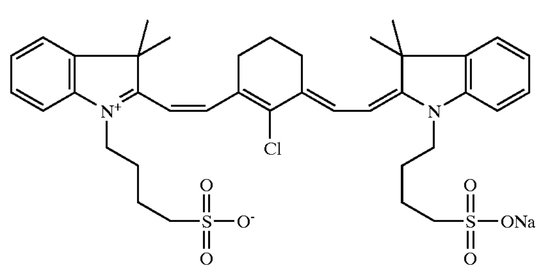

(B)

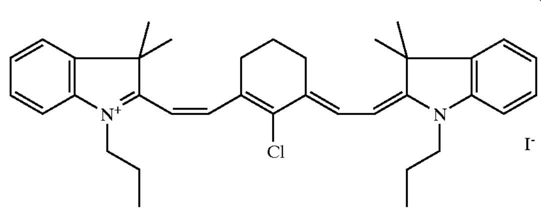

-continued (C)

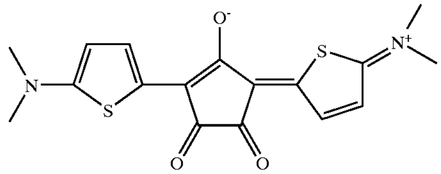

(D)

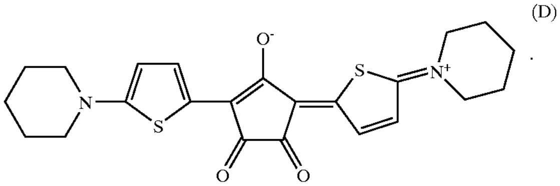

18. The method of claim 13 wherein the antenna is tuned to readily absorb infrared radiation.

19. The method of claim 13 wherein the other of the dye and the color developer compound comprises particles with average diameter of no more than about 20 μm.

20. The method of claim 13 wherein the direct imaging material comprises 3 wt %–90 wt % solid particles.

21. The compound of claim 13 wherein the direct imaging material comprises 5 wt %–80 wt % solid particles.

22. The compound of claim 13 wherein the direct imaging material comprises 10 wt %–60 wt % solid particles.

23. The method of claim 13 wherein the binder is UV curable.

24. An imaging composition made by the method of claim 13.

25. An image recording medium, the medium comprising:

a substrate an imaging composition comprising, a solvent an antenna; a dye; and a color initiator;

wherein the dye changes color when mixed with the color initiator;

wherein one of the color initiator end the dye is soluble in the solvent at ambient conditions;

wherein the other of the color initiator and the dye is substantially insoluble in the solvent at ambient conditions;

wherein the substantially insoluble component is substantially uniformly distributed in the solvent; and wherein the imaging composition is directly or indirectly applied to the substrate.

26. The medium of claim 25 wherein the dye comprises a leuco dye.

27. The medium of claim 26 wherein the dye comprises the following structure:

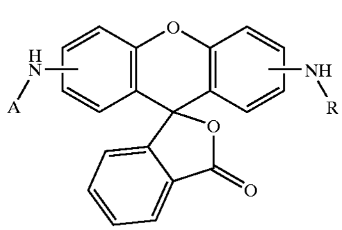

where A and R are aryl or alkyl groups.

28. The medium of claim 25 wherein the color initiator comprises phenolic compound.

29. The medium of claim 25 wherein the antenna comprises at least one of the compounds chosen from the group consisting of quinone, phthalocyanine, naphthalocyanine, metal complexes, azo, croconium, squarilium dyes, hexafunctional polyester oligomers, and the compounds represented by the following formulae;

(A)

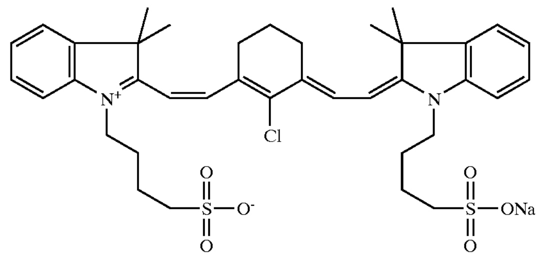

(B)

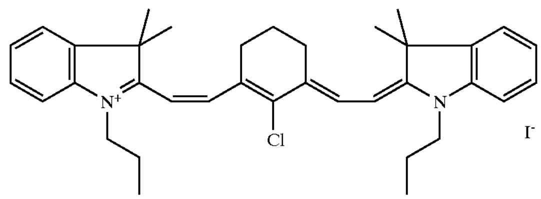

(C)

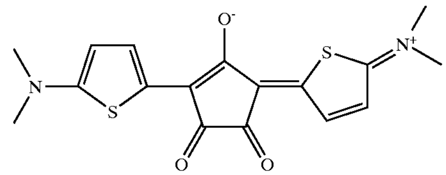

(D)

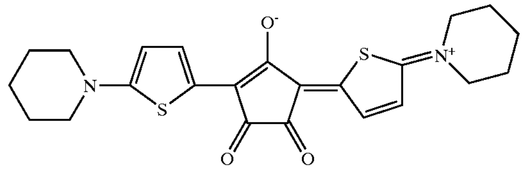

30. The medium of claim 25 wherein the antenna readily absorbs infrared radiation.

31. The medium of claim 25 wherein the substantially insoluble component comprises particles with an average diameter of no more than about 20 μm.

32. The medium of claim 25 wherein the direct imaging material comprises 40 wt %–80 wt % solid particle.

33. The medium of claim 25 wherein the solvent is UV curable.

34. The medium of claim 25 wherein the substrate comprises paper.

35. The medium of claim 25 wherein the substrate comprises a compact disc or DVD.

36. An imaging means, the means comprising:

a means for absorbing energy;

a means for forming color;

a means for initiating a color change in the color forming means;

a means for binding the absorbing means, the color forming means, and the initiating means;

wherein the absorbing means is dissolved in the binder;

wherein one of the means for forming color and the means for initiating is soluble in the means for binding at ambient conditions;

wherein the other of the means for forming color and the means for initiating is substantially insoluble in the means for binding at ambient conditions; and wherein the insoluble component is substantially uniformly distributed in the binder.

37. The means of claim 36 wherein the means for forming color comprises a leuco dye.

38. The means of claim 37 wherein the leuco dye comprises the following structure:

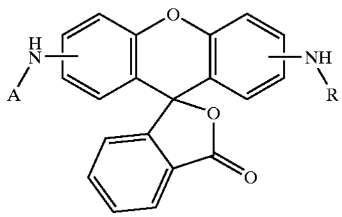

where A and R are aryl or alkyl groups.

39. The means of claim 36 wherein the means for initiating comprises a phenolic compound.

40. The means of claim 38 wherein the means for absorbing comprises at least one of the compounds chosen from the group consisting of quinone, phthalocyanine, naphthalocyanine, metal complexes, azo, croconium, squarilium dyes, hexafunctional polyester oligomers, and the compounds represented by the following formulae:

(A)

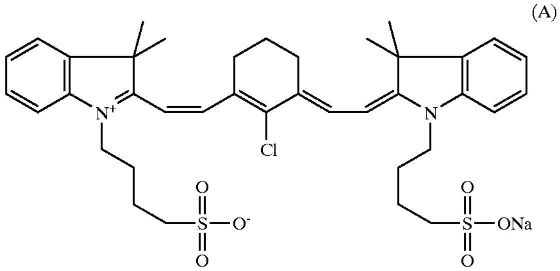

(B)

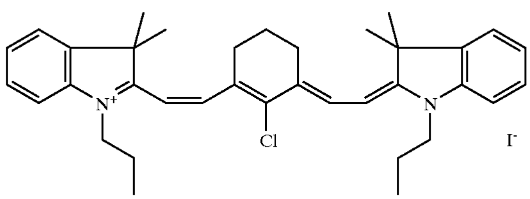

-continued (C)

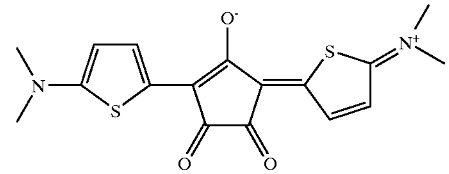

(D)

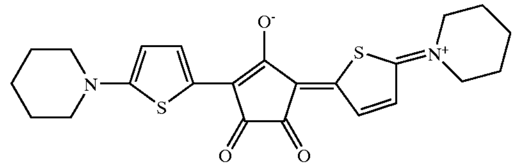

41. The means of claim 36 wherein the means for absorbing readily absorbs laser radiation.

42. The means of claim 41 wherein the means for absorbing readily absorbs infrared radiation.

43. The means of claim 36 wherein the substantially insoluble component comprises particles with an average diameter of no more than about 20 μm.

44. The means of claim 36 wherein the imaging means comprises 3 wt %–90 wt % solid particles.

45. The means of claim 36 wherein the imaging means comprises 5 wt %–80 wt % solid particles.

46. The means of claim 36 wherein the imaging means comprises 10 wt %–80 wt % solid particles.

47. The means of claim 36 wherein the means for binding is UV curable.

* * * * *

UNITED STATES PATENT AND TRADEMARK OFFICE
CERTIFICATE OF CORRECTION

PATENT NO. : 6,974,661 B2
APPLICATION NO. : 10/351188
DATED : December 13, 2005
INVENTOR(S) : Gore et al.

It is certified that error appears in the above-identified patent and that said Letters Patent is hereby corrected as shown below:

In the Claims

Col. 7 (line 5), delete “end” and insert therefor --and--.

Col. 9 (line 35), delete “solvent” and insert therefor --solvent;--.

Col. 9 (line 39), delete “end” and insert therefor --and--.

Col. 10 (line 47), delete “40wt % - 80wt %” and insert therefor --40wt % - 60wt %--.

Col. 12 (line 39), delete “10wt % - 80wt %” and insert therefor --10wt % - 60wt %--.

Signed and Sealed this

Twelfth Day of December, 2006

JON W. DUDAS
*Director of the United States Patent and Trademark Office*